United States Patent
Millet et al.

(10) Patent No.: US 8,814,051 B2
(45) Date of Patent: Aug. 26, 2014

(54) PERSONAL TOKEN HAVING ENHANCED COMMUNICATION ABILITIES FOR A HOSTED APPLICATION

(75) Inventors: François Millet, La Ciotat (FR); Sylvain Chafer, Marseilles (FR); Jan Nemec, Prague (CZ)

(73) Assignee: Gemalto SA, Meudon (FR)

( * ) Notice: Subject to any disclaimer, the term of this patent is extended or adjusted under 35 U.S.C. 154(b) by 912 days.

(21) Appl. No.: 12/528,746

(22) PCT Filed: Feb. 22, 2008

(86) PCT No.: PCT/EP2008/052201
§ 371 (c)(1),
(2), (4) Date: Feb. 25, 2010

(87) PCT Pub. No.: WO2008/104515
PCT Pub. Date: Sep. 4, 2008

(65) Prior Publication Data
US 2010/0178945 A1 Jul. 15, 2010

(30) Foreign Application Priority Data
Feb. 27, 2007 (EP) .................................. 07290250

(51) Int. Cl.
*H04L 29/08* (2006.01)
*G06Q 20/34* (2012.01)
*H04W 4/14* (2009.01)
*H04W 88/02* (2009.01)

(52) U.S. Cl.
CPC .............. *G06F 7/1008* (2013.01); *H04W 4/14* (2013.01); *G06Q 20/3574* (2013.01); *G06Q 20/341* (2013.01); *H04W 88/02* (2013.01); *G08C 2201/42* (2013.01); *G06Q 20/3552* (2013.01)
USPC ........................................ 235/492; 455/414.4

(58) Field of Classification Search
USPC ........................................................... 235/492
See application file for complete search history.

(56) References Cited

FOREIGN PATENT DOCUMENTS

| EP | 1 434 450 A1 | 6/2004 |
|----|--------------|--------|
| EP | 1439723 A1 | 7/2004 |
| EP | 1 452 964 A1 | 9/2004 |
| EP | 1 542 486 A1 | 6/2005 |
| GB | 2 410 113 A | 7/2005 |

OTHER PUBLICATIONS

Form PCT/ISA/210 of Application No. PCT/EP2008/052201 dated Jun. 4, 2008.
English language translation dated Feb. 9, 2012 of an Official Action issued by the Mexican Patent Office in corresponding Mexican Patent Application No. MX/a/2009/008645.

*Primary Examiner* — Daniel Hess
(74) *Attorney, Agent, or Firm* — Buchanan Ingersoll & Rooney PC

(57) ABSTRACT

The invention relates to a personal token for a mobile telecommunication network, hosting application software. The personal token is operable to receive an over-the-air SMS message encapsulating commands directed to the application, open the SMS and extract the commands from the SMS. The steps of opening the SMS and extracting the commands from the SMS are performed by a software entity in the personal token which is distinct from the application, so that the software entity initiates transmission of the extracted commands to the application.

7 Claims, 2 Drawing Sheets

PERSONAL TOKEN HAVING ENHANCED COMMUNICATION ABILITIES FOR A HOSTED APPLICATION

The invention relates to telecom personal tokens such as subscriber identity modules for accessing to mobile telecommunication networks.

The invention relates also to personal tokens in a broader meaning, i.e. personal tokens enabling access to protected resources such as credit cards allowing electronic payment and cash retrieving.

The invention relates to any kind of physical or software implementation of such personal tokens such as IC cards or USB format tokens.

The invention finds particular embodiments in the case of a subscriber identity module in a mobile phone, when such subscriber identity module performs also e-payment using a dedicated applet hosted in the card. Payment enabled SIMs may be designed to execute payment over a radio communication channel in association with a remote bank server or in association with a point-of-sale station over a near field channel, for example via an antenna extending inside the mobile telephone and electrically connected to the subscriber identity module for carrying command signals over radio waves.

Mobile network operators use to communicate with a SIM card in what is called the "over-the air" scheme. Banks use to communicate with a credit card via connection to bank terminals.

On FIG. 1, a telecom assembly comprising a mobile terminal 10 and a SIM card 20 is represented comprising also a SIM toolkit application 21 hosted in the card. The SIM card 20 may be called an UICC 'Universal Integrated Circuit Card", USIM, RUIM or any kind of xxSIM because it typically performs SIM functionality i.e. allows authentication of the subscriber to the mobile network.

A mobile network operator interacts with the SIM card first to identify the subscriber, and then to manage the SIM card through the over-the-air (OTA) scheme. Such OTA management of the SIM card mainly consists in managing, i.e. downloading, updating, deleting data files stored in the SIM card which store information allowing implementation of SIM authentication. Another purpose of the OTA management is managing, i.e. downloading, updating, deleting the instructions of the SIM toolkit applications present on the card. SIM toolkit applications run over the toolkit framework as defined in ETSI standard.

In the "over-the-air" scheme, the operator 30 manages the SIM card by sending commands to the SIM card 20 via the mobile terminal 10, on the "over-the-air" transport channel as referenced D2225 in the standards. In the "over-the-air" scheme, the mobile terminal 10 and the SIM card 20 communicate on a transport channel which is called channel 0 or basic channel in standard ISO 7816, referenced 30 on FIG. 1.

According to the standards, basic channel is reserved and dedicated to management of the data files and the SIM toolkit applications of the card, not to any other communication with the card.

On FIG. 2, a bank assembly comprising a bank server 40, a credit card 50 and a wired bank network 60 is represented which allows a bank to manage an on-card banking application 70. In a similar way to what has been previously described in relation to SIM card in a mobile telecommunication network, the bank manages the on-card bank application also on a basic channel which is described in ISO 7816 or ISO 14443 standard, more precisely in parts of the standard which relate to such basic channel.

The bank 40 manages the credit card 50 for personalizing user data, bank data, and for executing user operations.

In both cases, the basic channel 30, 80 is the legacy channel used by off-card applications to communicate with on-card subscriber identification logic, SIMtookit application or bank application in the case of a credit card.

SIM cards exist which host a payment application for remote payment or near-field communication payment, i.e. SIM cards may host an e-banking application. Such e-banking application is typically run in a Javacard runtime environment, and called e-payment applet in such case.

As illustrated on FIG. 3, in such scheme, the bank server 40 uses the MNO network to manage its banking application 70. The bank does not use the over-the-air scheme nor the basic channel between mobile terminal 10 and SIM card 20 to address the on-card banking application 70.

On the contrary, a middlet 90, i.e. a middle application 90 is used in the mobile terminal 10 which has for function to make the link between the bank server 40 and the on-card bank application 70. The middlet 90 processes over-the-air SMS messages originating from the bank server 40, extracts and interprets APDU command scripts encapsulated in such SMS messages and sends the APDU commands of the script to the on-card application 70 through a purposely established channel 35 between the mobile phone and the card.

This purposely established channel 35 is a channel expressly distinct from the basic channel 30 because the basic channel is technically dedicated to management of the SIM authentication and toolkit functionalities.

Although the mobile phone 10 provides such middlet 90 for enabling the communication between the bank server 40 and the banking application 70, the bank 40 faces several issues.

First, the bank is obliged to trust several hardware entities, i.e. the mobile phone 10 and the SIM Card 20.

Second, the bank is obliged to deploy the system upon different hardware entities with different technical specificities, i.e. here also the mobile phone 10 and SIM card 20.

Third, the bank must upgrade its card applications so that these applications support other channels than the usual basic channel 80 as used in the banking world according to the standards, i.e. the banking application must be upgraded so as to be operable in the telecom context over the specific channel 35.

Fourth, and consequently to that, in comparison to the usual banking scheme, the bank has to upgrade its banking server 40 as well as an off-card application hosted in the banking server 40 so as to operate the upgraded on-card application 70.

Furthermore, so as to establish a link between the bank server 40 and the on-card application 70 a usual mobile engine has to provide the capability of installing applications into the mobile phone 10 and/or in the SIM card 20 which applications will manage the link between the mobile phone and the SIM card.

In addition, the mobile engine must be enabled to send ISO 7816 or 14443 APDU commands to the on-card application 70 inside the SIM card on another channel than the basic one. The JSR 177 for J2ME™ Mobile or a proprietary API 95 are necessary for such purpose, which constitute additional tools and investments to the also necessary middlet 90 described before. The SIM card 20 shall further have to provide the capability of loading and installing the bank applications such as application 70.

The SIM and phone assembly necessitates many adaptations for performing such scheme and is therefore costly and uneasy to implement on the field, thereby slowing the launching of SIM based applications.

In another device of the prior art, it has been proposed to communicate from a remote server to a SIM toolkit application of the card, especially for updating data of the SIMToolkit application, by means of the SMS OTA scheme. The application is designed for opening itself the incoming OTA SMS and for extracting APDU command which are encapsulated in the SMS.

Such a device requires an especially enhanced application which is designed not only for executing the instructions, but also for implementing the functionalities of opening the SMS which are received over the basic channel between the mobile phone and the SIM, and the extracting of the ADPU before executing the instructions. Developing such an application is a heavy burden for the application provider which must therefore rely on an application communicating over another channel, such as described here above.

It is therefore desirable to simplify the tasks of a remote user of application(s) on a SIM or and the tasks of a provider of such application(s), such as a bank entity for performing e-payment or similarly for a transport company for transport access SIMs.

Such purpose is achieved by way of the invention as recited in the appended claims.

Other aspects, purposes and advantages of the invention will appear through the description made in reference to the accompanying drawings, among which:

Figure 1:
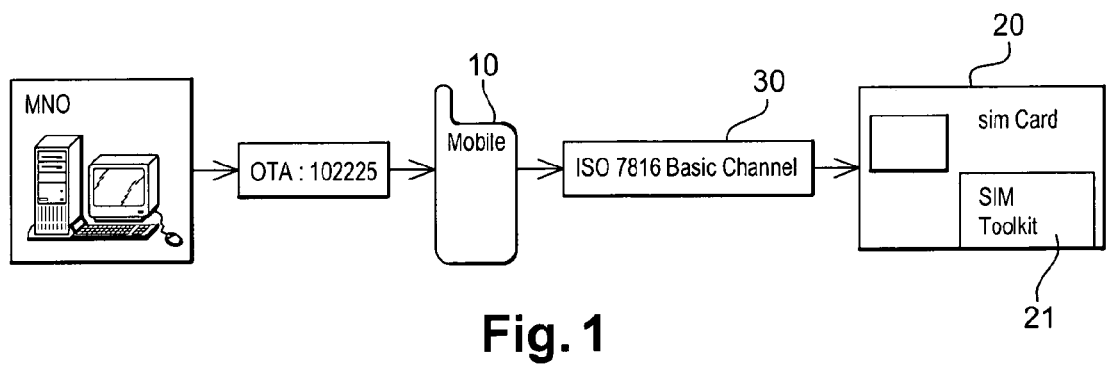
FIG. 1 represents a telecommunication assembly for managing an on-card application according to prior art.
Figure 2:
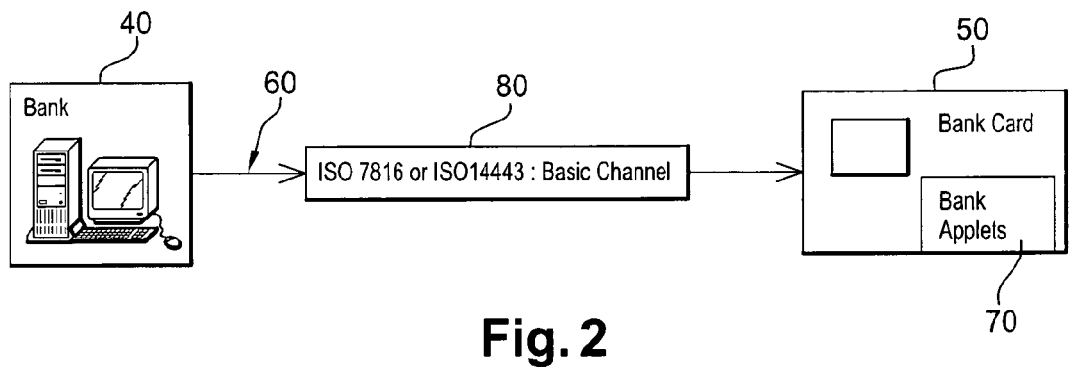
FIG. 2 represents a banking assembly for managing an on-card application according to prior art.
Figure 3:
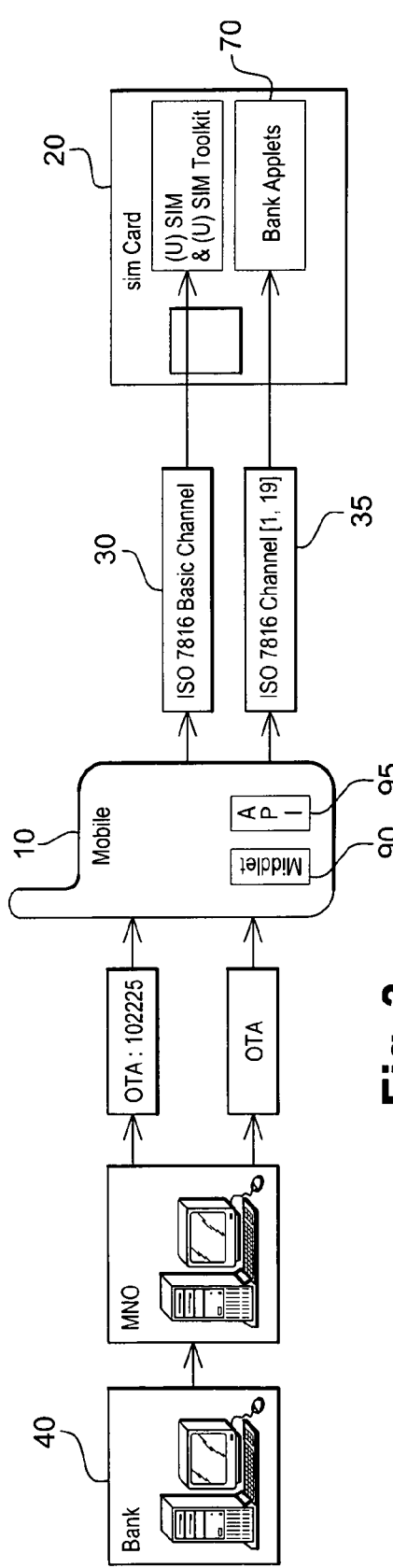
FIG. 3 represents a telecom assembly for managing an on-SIM and banking application according to prior art.
Figure 4:
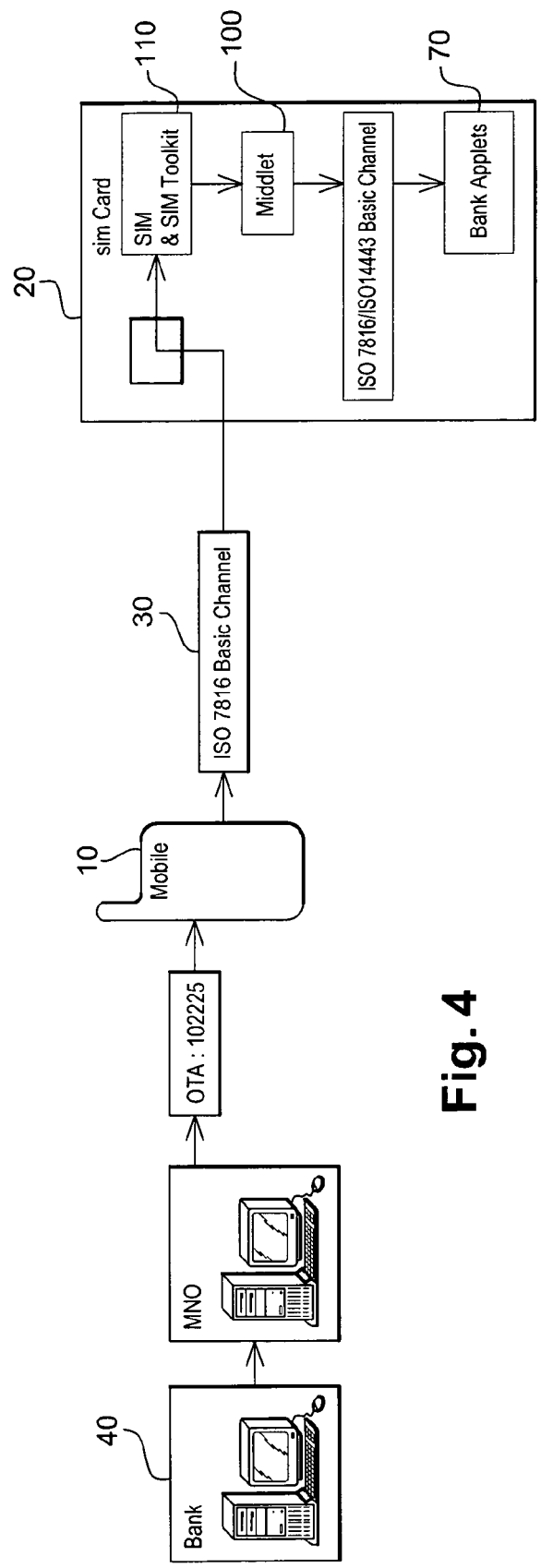
FIG. 4 represents a telecom assembly for managing an on-SIM banking application according to an embodiment of the invention.

The present embodiment of the invention makes extensive use of the ability of a usual mobile phone engine to support the OTA link between a remote server and functionalities of the SIM card, implementing such link over the basic channel for transiting SMS as technically stated in ETSI 102225 and ETSI 102226.

Let's suppose the remote server hosts an application which attempts to reach an application residing on the card, for launching such application, for personalizing or updating such application, or for having such application run a set of APDU commands to be sent to the application.

In the present embodiment, the mobile engine transfers received over-the-air SMS to the SIM card for the purpose of managing and/or communicating with the on-card banking application onto the basic channel without extracting any data from the over-the-air SMS.

In the present case, a middlet 100 is stored and run in the SIM card 10 which extracts the APDU commands from the received SMS messages over the OTA scheme only once the considered message is arrived inside the card.

The on-card middlet 100 is accessible over-the-air through a dedicated SimToolkit application 110.

The present on-card middlet 100 has the capability of interpreting an APDU command list. The ETSI 102-226 APDU script is presently used.

The on-card banking application 70 is run as it was running on the prior art credit card infrastructure. The application 70 is run according to its runtime environment. For a Java Card application it is the Java Card Runtime Environment. For an application running on top of Global Platform card its is the OPEN (Open Platform ENvironment).

The on-card middlet 100 then sends the APDU commands to the application 70 which APDU commands are intended to exchanging running commands and data and/or intended to updating the application 70.

The on-card middlet 100 can be a resident application or be loaded and installed on the SIM card.

Here the on-card middlet 100 is addressed Over-The-Air. The present on-card middlet 100 is associated with an on-card stored TAR (ToolKit Application Reference) (See 102225), i.e. a special code, which has to be present in a header of the incoming SMS message so that the message be processed by the middlet 100. The middlet opens a header of the SMS and checks whether the code is present in the header. When the code is present in the header of the SMS, the middlet 100 identifies that the message is directed to Java card applications.

More precisely, the header includes one of several identifying codes corresponding to the respective Javacard applications which are present in the card. The middlet 90 directs the message to the Javacard application which corresponds to the particular identifying code in the header.

The on-card middlet 90 implements the processToolkit interface.

The present on-card middlet further sends back the responses of the on-card application 70 by encapsulating APDU commands as output from the on-card application into outbound SMSs. The APDU would be otherwise transmitted as such to the mobile phone 10 on a special channel in another scheme. Here the SMS messages are sent to the mobile phone 10 on the basic channel 30 and then to the remote bank server 40.

The runtime Environment, i.e. Javacard environment in the present example, which is accessible through the on-card middlet 90, therefore manages the card content thanks to the on-card middlet. Although the present embodiment is described in connection with Javacard runtime environment, Global Platform Card specification may be used as an alternate example of runtime environment. The middlet 90 may also support both Javacard and Global Platform runtime environments. In such alternate embodiment, the middlet 90 opens a secure channel as specified in Global Platform Card specification, and supports Java Card Runtime Environment and associated API(s).

The middlet 90 further provides an API 95 so as to interface the middlet with any runtime environment. The SIM card is associated with such respective API 95 on the SIM card so as to execute any on-card application according its runtime environment, the runtime environment being based either on Java Card™ or Global Platform Card Specification.

In the present embodiment, the bank is the entity which provides the application to be managed.

This invention applies for any application provider that wants to manage and use on-card applications through the mobile network. For example the application provider could be a transport operator in the case of a SIM card allowing access to transport system by near-field authentication. Many other entities which may implement their own applications on the SIM may take benefit of the invention.

Thanks to such an embodiment, the application provider may control card content operation through the on-card middlet 90, and use its sole existing off-card application to manage its on-card applications.

An advantage of the present embodiment is that the mobile phone does not need to establish any link other than the basic channel for the purpose of accessing the applications and as a consequence does not need to support installation of any application which may manage the link between the bank and the on-card application.

An API for sending APDU commands to the SIM card is no more needed in the mobile phone because the APDU commands are not extracted from the over-the-air SMS messages inside the mobile phone.

The bank does not need to trust several hardware entities, i.e. mobile phone and SIM card, does not need to deploy the system upon different hardware entities, mobile phone and SIM card, does not need to upgrade the on-card applications to support another channel than the basic one, and the bank does not need to upgrade the off-card system to manage a new on-card application.

The bank takes the advantage of relying to only one secure element, i.e. the SIM card, deploying its system on only one entity, i.e. the SIM card, and using its standard off-card infrastructure to manage its on-card applications.

This invention applies to any on card application, compliant with ISO 7816 or ISO 14443 or other proprietary way, running over Java Card Runtime Environment™, Global Platform Card specification or other proprietary way, that shall be managed Over The Air.

The invention claimed is:

1. A method for acting upon an application hosted in a personal token for a mobile telecommunication network, comprising the steps which include:
   receiving, at a mobile terminal, at least an over-the-air SMS message,
   transmitting the SMS message to the personal token,
   opening the SMS,
   reading a code placed in a header of the SMS message,
   recognizing a dedicated code which indicates that the SMS is directed to the application, and
   after the dedicated code is recognized, initiating transmission of the SMS message to the application without extracting data included in a body of the SMS message,
   wherein the data included in the SMS message includes commands directed to the application,
   wherein the steps of opening the SMS, reading the code, and recognizing the dedicated code are performed by a software entity hosted in the personal token,
   wherein the step of initiating transmission of the SMS message to the application is performed by a middlet hosted in the personal token, and
   wherein the software entity and middlet are distinct from the application.

2. The method according to claim 1, wherein the commands directed to the application are commands to be executed by the application.

3. The method according to claim 1, wherein the commands directed to the application are instructions to be placed into a piece of software which constitutes the application as updating instructions.

4. The method according to claim 1, wherein the commands directed to the application are APDU commands.

5. The method according to claim 1, wherein the application in the personal token is a javacard application.

6. The method according to claim 1, wherein the software entity and middlet which perform the steps of reading the code, recognizing the dedicated code, and transmitting the commands to the application are applications which communicate with a mobile terminal hosting the personal token by way of SIMtoolkit commands.

7. A personal token for a mobile telecommunication network, hosting software comprising an application and operable
   to receive, via a mobile terminal, an over-the-air SMS message,
   read a code placed in a header of the SMS message,
   recognize a dedicated code which indicates that the SMS is directed to the application, and
   after the dedicated code is recognized, initiate transmission of the SMS message to the application without extracting data included in a body of the SMS message,
   wherein the data included in the SMS message includes commands directed to the application,
   wherein the steps of opening the SMS, reading the code, and recognizing the dedicated code are performed by a software entity hosted in the personal token,
   wherein the step of initiating transmission of the SMS message to the application is performed by a middlet hosted in the personal token, and
   wherein the software entity and middlet are distinct from the application.

* * * * *